United States Patent [19]

Donaldson et al.

[11] Patent Number: 5,664,043
[45] Date of Patent: Sep. 2, 1997

[54] HERMETIC OPTICAL FIBRE FEED-THROUGH

[75] Inventors: Alan Donaldson; Steven John Freer, both of Paignton, United Kingdom

[73] Assignee: Northern Telecom Limited, Montreal, Canada

[21] Appl. No.: 684,128

[22] Filed: Jul. 19, 1996

[30] Foreign Application Priority Data

Jul. 21, 1995 [GB] United Kingdom ............. 9515004

[51] Int. Cl.$^6$ .................................................. G02B 6/36
[52] U.S. Cl. ........................... 385/138; 385/78; 385/72
[58] Field of Search ......................... 385/88–94, 138, 385/139, 128, 76, 77, 78, 72

[56] References Cited

U.S. PATENT DOCUMENTS

| | | | |
|---|---|---|---|
| 4,119,363 | 10/1978 | Camlibel et al. | 350/96.2 |
| 4,488,773 | 12/1984 | Wagner | 350/96.2 |
| 5,568,585 | 10/1996 | Kramer | 385/139 |

FOREIGN PATENT DOCUMENTS

| | | |
|---|---|---|
| 2 003 294 | 3/1979 | United Kingdom . |
| 2 064 862 | 6/1981 | United Kingdom . |
| 2 124 402 | 2/1984 | United Kingdom . |
| 2 215 082 | 9/1989 | United Kingdom . |

*Primary Examiner*—John Ngo
*Attorney, Agent, or Firm*—Lee, Mann, Smith, McWilliams, Sweeney & Ohlson

[57] ABSTRACT

An optical fiber hermetic feed-through for polarization maintaining fibre has, contained within a hollow metallic plug, a ceramic ferrule that is a concentricity providing sliding fit around the fiber and serves to hold the fiber centered in an aperture in the end wall of the plug. The fiber is secured with adhesive in the bore of the ferrule which is similarly secured within the plug. An hermetic seal between plug and fiber is provided by a soft solder fillet whose short length and circular symmetry minimises the stress applied to the fibre by the freezing of the solder and thereby minimises the degradation of the polarisation maintaining properties of the fibre.

10 Claims, 2 Drawing Sheets

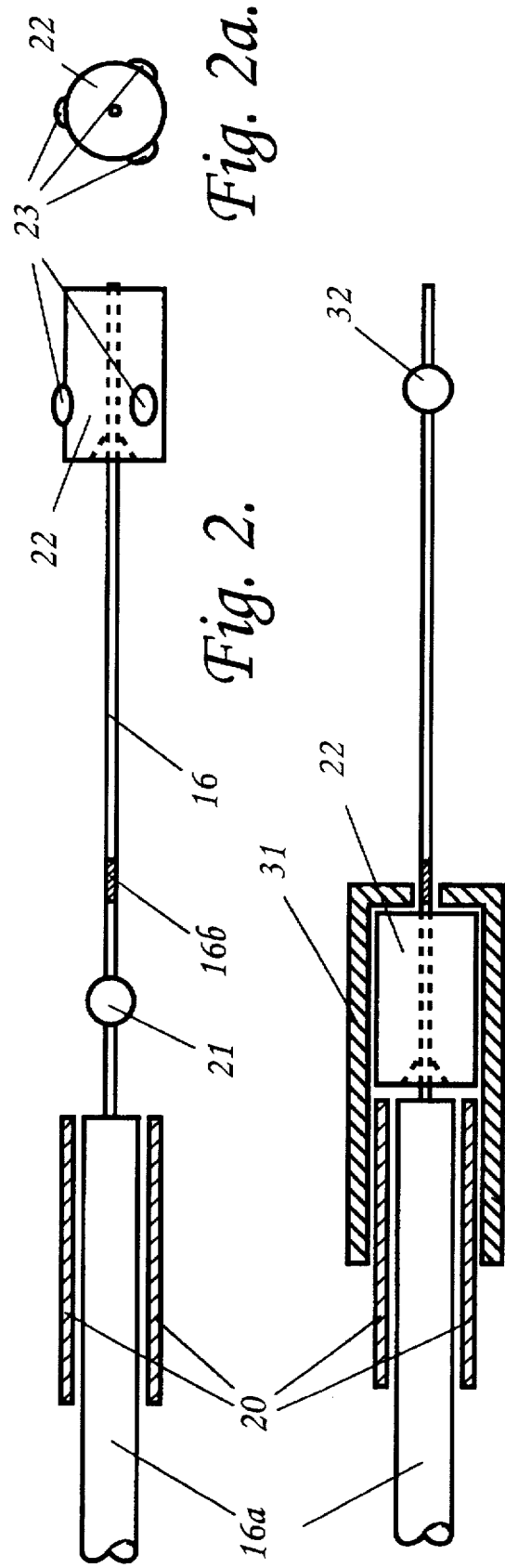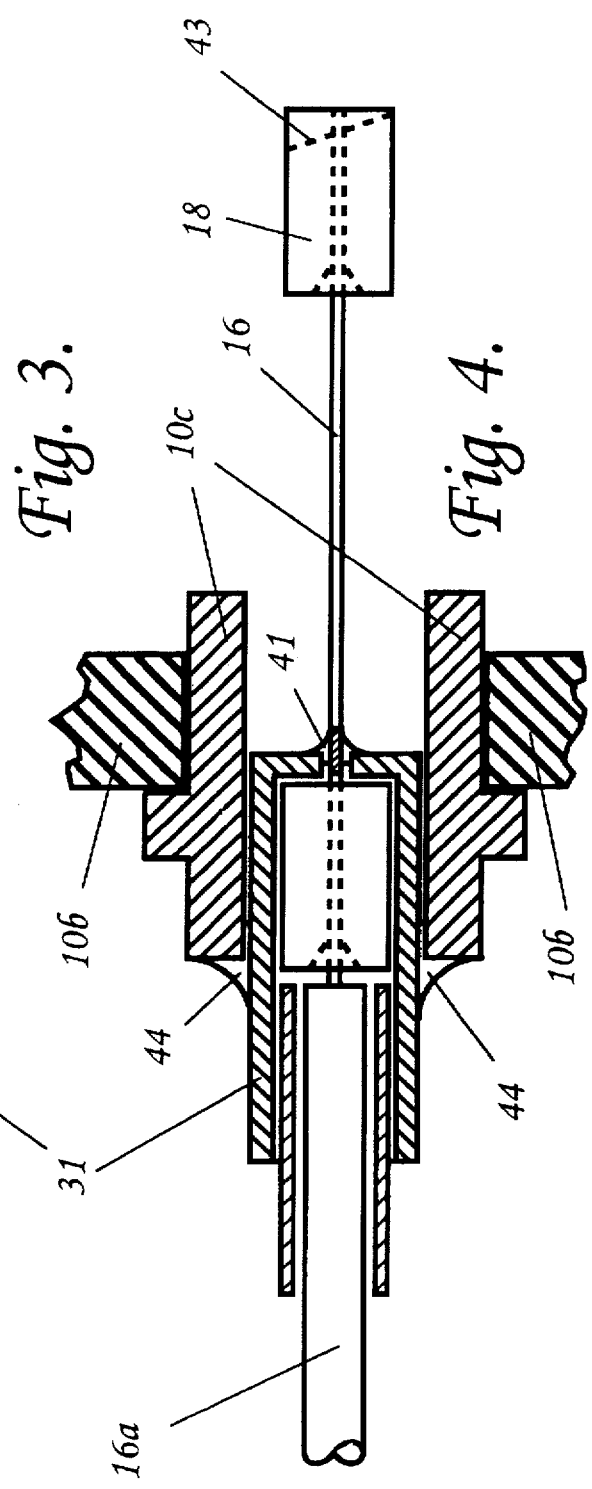

HERMETIC OPTICAL FIBRE FEED-THROUGH

BACKGROUND TO THE INVENTION

This invention relates to the provision of an hermetic design of optical fibre feed-through that is capable of being used for feed-through of polarisation maintaining fibre. Hermetic feed-through suitable for the feed-through of circularly symmetric optical fibre are known, and have been in use for some years. Thus in the laser of the laser package described in GB 2 124 402A the package is provided with an optical fibre pigtail that is hermetically sealed through one wall of the package. This seal is provided by metallising the fibre over a portion of its length, soldering with gold tin solder that metallised region within the bore of a length of support tube and then soft soldering the end of the support tube within the bore of a feed-through tube that has previously been sealed by brazing in an aperture extending through the package wall.

Typically the support tube is constituted by a length of hypodermic tubing, and soft solder can be substituted for the gold-tin solder employed for securing the metallised optical fibre within the bore of the hypodermic tubing. Though this sealing method is satisfactory for feed-through of circularly symmetric optical fibre, it has been found quite unsatisfactory for feed-through of polarisation maintaining fibre because the sealing process is found to disrupt the polarisation maintaining properties of the polarisation maintaining fibre. An explanation for this postulates that soldering the fibre within the hypodermic tube sets up a non-uniform stress field within the fibre that disrupts the stress field previously present in the fibre to provide its polarisation maintaining properties.

SUMMARY OF THE INVENTION

The present invention is directed to a method of providing an hermetic feed-through that substantially eliminates this generation of a non-uniform stress field, and that in consequence is suitable for use in the hermetic feed-through of polarisation maintaining optical fibre.

According to the present invention there is provided a package having at least one wall through which an optical fibre hermetic feed-through extends, which feed-through includes a metallic cylindrical plug with a substantially axial small bore in one end thereof, which small bore is dimensioned to be a concentricity providing sliding fit around a portion of metallised bare optical fibre, and which small bore opens out internally into an enlarged substantially co-axial bore that is dimensioned to be a concentricity providing sliding fit around a cylindrical ferrule provided with an axial bore dimensioned to a concentricity providing sliding fit around the metallised bare fibre, wherein the fibre is secured to the ferrule with adhesive within its bore, wherein solder, at the point of emergence of the fibre from the small bore end of the plug, provides an hermetic seal between the metallised bare fibre and the plug, and wherein the plug is hermetically sealed within an aperture extending through said at least one wall of the enclosure.

The fit of the small bore of the plug, and of the bore of the ferrule, around the metallised bare fibre has been characterised as a concentricity providing sliding fit because the clearance is required to be as small as possible to ensure that the fibre is held concentrically within those bores, and yet provide adequate clearance to ensure that the fibre is able to be threaded freely through both bores.

The invention also provides a method of making an optical fibre hermetic feed-through which feed-through includes a metallic plug provided with a bore dimensioned to be a concentricity providing sliding fit around a metallised portion of bare fibre, wherein fibre positioning means to which the fibre is secured is engaged with the plug so as to hold the fibre substantially concentric within said bore and wherein, while so held, the fibre is hermetically sealed within said bore by solder which is substantially uniformly distributed around the fibre within said bore.

The invention further provides a method of providing an hermetic feed-through of a length of optical fibre through a metallic wall of a package, wherein a length of plastics protective coated optical fibre has a length of its plastics protective coating stripped from one end to leave bare fibre, a portion of which bare fibre is then metallised, wherein a ferrule and then a metallic cylindrical plug are threaded over the fibre, the metallic plug having a substantially axial small bore in one end thereof, which bore is dimensioned to be a concentricity providing sliding fit around the metallised bare fibre and which small bore opens out internally into an enlarged substantially co-axial bore that is dimensioned to be a concentricity providing sliding fit around the ferrule, and the ferrule having an axial bore dimensioned to be a concentricity providing sliding fit around the metallised bare fibre, wherein the fibre is secured in the bore of the ferrule and the ferrule is secured in the enlarged bore of the plug, and wherein solder forming an hermetic seal is applied formed into a fillet uniting the metallised bare optical fibre to the plug at the point of emergence of the fibre therefrom.

The ferrule is preferably a ceramic ferrule, and the fibre can be secured with adhesive, such as an epoxy resin, to the ceramic ferrule in a manner which does not significantly degrade the polarisation maintaining properties of the fibre. This adhesive bond can be made adequately resistive to tensile stress, applied in a manner to pull the fibre out of sleeve, having regard to the fact that the adhesive can extend the full length of the sleeve. The adhesive bonding of the ceramic sleeve to the inner wall of the metallic plug can similarly be made adequately resistive to tensile stress. However, neither of these bonds exhibits adequate hermeticity for reliable packaging of lithium niobate crystal modules which are susceptible to inter-electrode arcing problems resulting from the ingress of water vapour into their packages. The requisite hermeticity of the seal between the metallised fibre and the metallic plug is instead provided by the solder at the point of emergence of the fibre from the plug. The stress applied to the fibre at this point by the solder upon solidification is kept to an acceptably low value by the shortness of the small bore of the plug to limit the length of the solder seal in the axial direction of the fibre, by the limited clearance between the fibre and the small bore of the plug, and also by the relatively high degree of concentricity provided between the fibre and the plug by the use of the ferrule. This contrasts with the prior art use of hypodermic tubing where the clearance is larger and for which there is no mechanism to hold the fibre centrally in the bore with the result that the fibre is very liable to be in contact with the inner wall of the hypodermic tubing over at least a portion of its length. The fact that this solder may not itself be particularly resistive to tensile stress is no serious drawback because this is backed by the generally larger resistivity to tensile stress provided by the adhesive bonds between the fibre and the sleeve and between the sleeve and the plug.

BRIEF DESCRIPTION OF THE DRAWINGS

There follows a description of the manufacture of an hermetic feed-through for a polarisation maintaining optical fibre threading one wall of a package containing a lithium niobate Mach Zehnder optical modulator.

3

Figure 1:
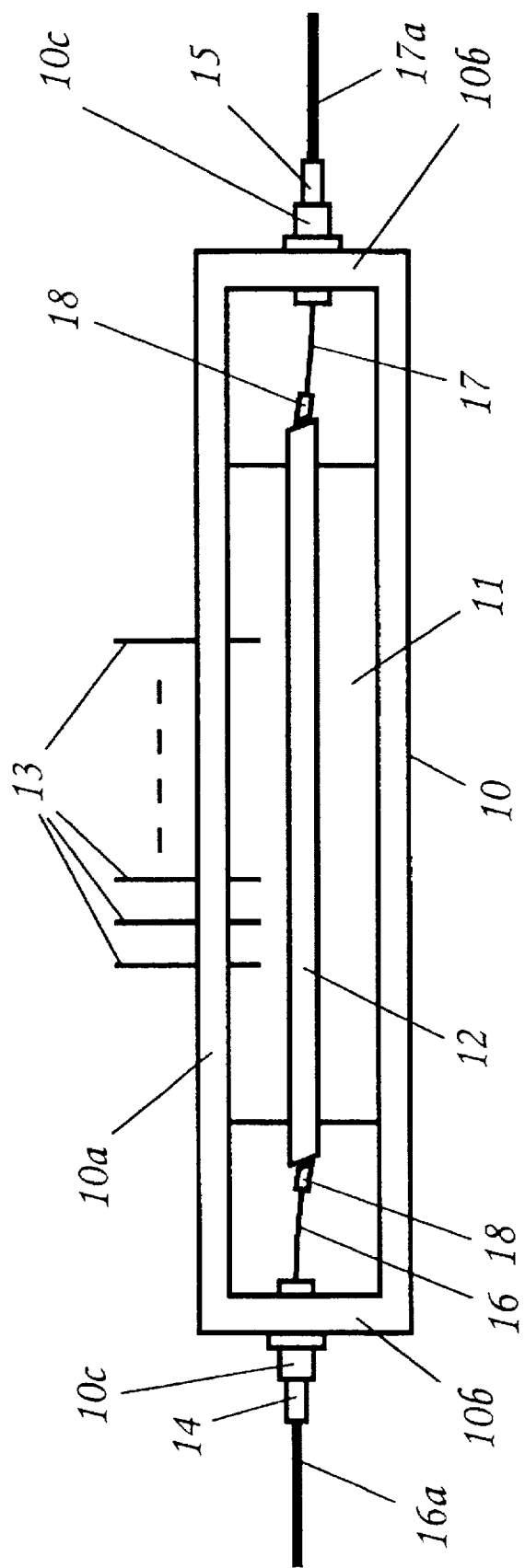

The description refers to the accompanying drawings in which:

FIG. 1 is a schematic view of the modulator package before the fitting of its lid FIGS. 2, 3 and 4 depict schematic longitudinally sectioned view of one of the hermetic optical fibre feed-throughs of the package of FIG. 1 at successive stages in its manufacture, and FIG. 2a depicts corresponding end view of the feed-through at the stage of manufacture represented in FIG. 2.

DETAILED DESCRIPTION OF A PREFERRED EMBODIMENT

Referring to FIG. 1, the package has the form of an open rectangular box 10 made by low expansion alloy such as KOVAR, and containing the lithium niobate modulator, the box being hermetically sealed by the fitting to its top of a lid (not shown). Within the box 10 its base is provided with a raised platform 11 that extends the full width of the interior of the box, but which terminates short of each end. To this platform 11 is secured a lithium niobate optical modulator comprising an electroded bar 12 of lithium niobate in which is formed a Mach Zehnder waveguide configuration (not shown) the two arms (not shown) of which exhibit optical path lengths that are electro-optically adjustable by means of electric fields applied to the electrode structure (not shown) of the lithium niobate bar 12. These fields are applied by way of hermetic electrical glass-to-metal feed-throughs 13 of conventional design located in one side wall 10a of the box 10. Through each end wall 10b of the box is a bush 10c hermetically threaded by an optical fibre hermetic feed-through 14, 15 through which is hermetically fed a single optical fibre 16, 17. These fibres are bare fibres 16, 17 within the package, but have plastics protective coatings 16a, 17a outside the package. Fibre 16 constitutes the input fibre of the modulator, and is a length of high-birefringence polarisation maintaining fibre. Fibre 17 constitutes the output fibre of the modulator, and so does not need to be made of high-birefringence polarisation maintaining fibre, but can be made of conventional circularly symmetric fibre.

Preferably the platform 11 is made slightly shorter than the lithium niobate crystal bar 12 which is secured to the platform so that the ends of the bar overhang the ends of the platform. The inner ends of the two fibres are housed in ferrules 18 secured to the respective end facets of bar 12 in registry with respective optical waveguides formed in the bar. In order to minimise problems of back reflection at the interfaces between the end facets of the bar 12 and the inner ends of the ferruled fibres 16 and 17, the ends of the rod and of the fibres have inclined facets whose angles of inclination are chosen to take account of refractive effects at these interfaces. The feed-throughs 14 and 15 extend normally through the end walls of the box 10, and so each length of bare fibre 16, 17 extends in an arcuate path from its point of emergence from its ferrule 18 to its respective feed-through 14, 15. This arcuate path serves to provide mechanical and thermal expansion mismatch decoupling between the inner end of each optical feed-through and the associated end of the lithium niobate bar.

FIG. 1 does not show any constructional details of the hermetic optical feed-throughs 14 and 15. These will now be described with reference to FIGS. 2, 2a, 3 and 4.

Referring first to FIG. 2, a crimpable metal support sleeve 20 is fitted over the end of a length of plastics protective coated polarisation maintaining fibre, and then a short section of the plastics protective coating is stripped from the end of the fibre to leave bare fibre 16 protruding from the end of the plastics protective coating 16a. This plastics coating 16a may, in the case of polarisation maintaining optical fibre 16, comprise a primary plastics coating, typically coating the bare 125 μm diameter fibre to a diameter of 250 μm, inside a loose plastics tubular jacket with an approximately 400 μm diameter bore and a 900 μm outer diameter. Both the primary coating and the loose jacket are stripped back to the same point. A short portion 16b of this bare fibre 16 is metallised to make it solder wettable. A bead 21 of adhesive resin is applied to the bare fibre 16 a few millimetres ahead of the forward end of the plastics protective coating, and then a low thermal expansion ceramic ferrule 22, for instance of alumina, is introduced over the metallised bare fibre end. This ferrule has a bore that is a concentricity providing sliding fit around the metallised bare fibre, this bore being flared at one end in order to assist the threading of the fibre. Adhesive resin, for instance in the form of three beads 23 equispaced around the circumference of the ferrule, is then applied to the external curved surface of the ferrule before a low thermal expansion hollow cylindrical metal plug 31 (FIG. 3), for instance of plated KOVAR, is fitted over the end of the ferrule 22. This plug 31 has an axial bore that is a concentricity providing sliding fit around the metallised bare fibre (e.g. 130 μm diameter bore for metallised 125 μm diameter fibre) and that, after a short distance of typically about 1 mm, opens into a larger co-axial bore that is dimensioned to be a concentricity providing sliding fit around the ferrule 22 and around the support sleeve 20. (If desired, a greater tolerance of fit between the support sleeve 20 and the larger coaxial bore may be employed since concentricity of the sleeve within the bore is not critical.)

The support sleeve 20, having previously been crimped (not shown) in order to secure it to the plastics protective coating 16a (in the case of crimping to a coating that includes a loose jacket, the crimp bond is only to the jacket), is externally coated with resin (not shown) before plug 31 is advanced over the end of the ferrule 22 until the forward end of the ferrule comes up against the rear-facing surface of the plug at the forward end of its larger bore. The advance of the plug 31 is continued until it carries the ferrule 22 over the adhesive resin bead 21 and on into resin-spaced abutment with the end of the plastic protective coating 16a of the fibre 16. In this position the metallised portion 16b of bare fibre 16 extends forwardly a short distance out of the mouth of the small bore of the plug 31. At this juncture the plug may be rotated on its axis relation to the fibre in order to effect more even spreading of the resin of beads 21 and 23. The amount of adhesive resin constituting the bead 21 is chosen to be small enough to ensure that it will not wick all the way up the bore of ferrule to its forward end where it could interfere with subsequent soldering of the fibre within the small bore of the plug.

The adhesive resin may be thermally cured at this stage, but generally it is preferred to delay curing of the resin until after the fitting of the ferrule 18 to the end of the bare fibre 16. This is because an adhesive resin bead 32 is employed to bond the fibre 16 to the ferrule 18 in the same way as adhesive resin bead 21 is employed to bond the fibre to the ferrule 22, and so the thermal curing of all the resin can conveniently be performed simultaneously in a single resin-curing operation.

Following the curing of the resin an hermetic seal between the metallised region 16b of the fibre 16 and the plug 31 is made with a small fillet 41 (FIG. 4) of soft solder.

The ferrule 18 is designed to be affixed later, with light-curing adhesive resin, to the end of the lithium niobate bar 12, and so it is desirable for this ferrule to be made of a relatively low thermal expansion ceramic material, such a zirconia, whose thermal expansion coefficient has a value lying between the maximum and minimum coefficient values exhibited by the crystalline lithium niobate bar 12 in different directions lying in the planes of its end facets. (The match between the expansion coefficient of zirconia and that of the fibre is less good, but is still adequate because of the more favourable configuration of bond between fibre and ferrule compared with that between ferrule and bar. Once the ferrule 18 has been secured, its orientation with respect to the fast and slow axes of the polarisation maintaining fibre 16 is determined, and then the front end face of the ferrule is ground and polished to the required angle and orientation to provide an inclined end facet for butting against the end face of the lithium niobate rod.

It has been explained that, in the formation of the prior art hermetic optical fibre feed-through that employs solder to seal a metallised optical fibre in the bore of a length of hypodermic tubing, the shrinkage of the solder upon freezing stresses the fibre to an extent that makes the technique unreliable for making hermetic optical fibre feed-throughs for polarisation maintaining fibre. Shrinkage of the soft solder fillet 41 upon freezing will similarly result in a stressing of the optical fibre that it encircles, but the amount of this stress is much smaller, and so the degradation of the polarisation maintaining properties of the fibre is kept within acceptably low bounds. This is due in part to the fact that less solder is employed in making the hermetic seal, and also in part due to the more symmetric distribution of the solder around the fibre. In this context it may be noted that the axial extent of the solder fillet 41 can be relatively short since it is not required to be load-bearing to any significant extent in a pull test in which force is applied to the fibre by way of its plastics protective coating in a direction tending to pull the fibre 16 out of the plug 31. In such a pull test, some of the load may be taken via the crimp bond between the coating 16a and the support sleeve 20 this bond being mechanically in series with the solder bond between the support tube and the plug 31. Generally this load is a small proportion of the whole load because, typically, the plastics protective coating on polarisation maintaining fibre is not tightly bonded to that fibre. Accordingly most of the loading of the pull test is taken by the bond made directly with the bare fibre 16, and the majority of this load is taken by the adhesive bond between the fibre 16 and the ferrule 22, this bond being mechanically in series with the adhesive bond between the ferrule 22 and the inner wall of the plug 31. A more symmetric distribution of the solder around the fibre is obtained with the solder fillet 41, than with the hypodermic tubing, because the bore of ceramic ferrule has less clearance around the fibre than does the bore of the hypodermic tubing, the ferrule bore having a flared end to facilitate the threading of the fibre. In its turn this ferrule holds the fibre relatively well centered in the small bore of the plug 31. This is in contrast with the situation pertaining with the hypodermic tubing in which, in default of any mechanism for centering the fibre within the tubing, the fibre is most liable to rest in contact with the inner wall of the tubing over a significant portion of the length of that tubing.

The plug 31 is dimensioned to slide freely through the central bore of the bush 10c in the end wall 10b of the box 10. The ferrule 18 is threaded through the bore of the bush and is secured in position on the end face of the lithium niobate bar 12. The length of bore fibre 16 protruding from its plastics protective coating 16a is chosen so that, with the ferrule 18 in position on the end face of the bar 12, the forward end of the plug 31 lies engaged within the bore of the bush 10c. The plug 31 is then hermetically sealed in position in the bush 10c by means of a solder fillet 44, the bush having previously been hermetically sealed in position in end wall 10b by brazing. Because of the linear and angular offset of the axis of the ferrule 18 with respect to the plugs 31, the bare fibre 16 extends in an arcuate path between the two which, after the securing of the plug 31 to the bush 10c, can readily accommodate small changes in position of the ferrule 18 with respect to the plugs 31 occasioned for instance by effects of thermal expansion mismatch.

Stress in the feed-through 15 is in no way so critical if, as is generally the case, the fibre 17 is circularly symmetric rather than polarisation maintaining fibre. Therefore it is not strictly necessary to employ the same low-stress configuration as used in feed-through 14, though generally it is found more convenient to do so.

We claim:

1. A package having at least one wall through which an optical fibre hermetic feed-through extends, which feed-through includes a metallic cylindrical plug with a substantially axial small bore in one end thereof, which small bore is dimensioned to be a concentricity providing sliding fit around a portion of metal used bare optical fibre, and which small bore opens out internally into an enlarged substantially co-axial bore that is dimensioned to be a concentricity providing sliding fit around a cylindrical ferrule provided with an axial bore dimensioned to a concentricity providing sliding fit around the metallised bare fibre, wherein the fibre is secured to the ferrule with adhesive within its bore, wherein solder, at the point of emergence of the fibre from the small bore end of the plug, provides an hermetic seal between the metallised bare fibre and the plug, and wherein the plug is hermetically sealed within an aperture extending through said at least one wall of the enclosure.

2. A package having an optical fibre feed-through as claimed in claim 1, which feed-through is a polarisation maintaining optical fibre optical feed-through.

3. A package as claimed in claim 1, wherein the fibre is provided externally of the enclosure with a plastics protective coating that terminates within the enlarged bore of the plug adjacent one end of the ferrule.

4. A package as claimed in claim 1 wherein a length of sleeving engaged around the plastics protective coating of the fibre has one end inserted in the enlarged bore of the plug and is secured to both the plug and the plastics protective coating.

5. A package as claimed in claim 1, wherein the cylindrical ferrule is a ceramic cylindrical ferrule.

6. A package as claimed in claim 1, which package houses an electro-optic modulator, wherein the optical fibre terminates within the package and wherein the end of the fibre lying within the package is optically coupled with the modulator.

7. A package as claimed in claim 6, wherein the end of the fibre within the package is housed in the axial bore of a second ceramic ferrule which second ferrule is secured with adhesive to both the fibre and the modulator.

8. A package as claimed in claim 7, wherein the fibre extends between the plug and the second ferrule in an unconfined arcuate path.

9. A lithium niobate optical modulator hermetically enclosed in a package as claimed in any claim 6.

10. A method of providing an hermetic feed-through of a length of optical fibre through a metallic wall of a package, wherein a length of plastics protective coated optical fibre has a length of its plastics protective coating stripped from one end to leave bare fibre, a portion of which barn fibre is then metallised, wherein a ferrule and then a metallic cylindrical plug are threaded over the fibre, the metallic plug having a substantially axial small bore in one end thereof, which bore is dimensioned to be a concentricity providing sliding fit around the metallised bare fibre and which small bore opens out internally into an enlarged substantially co-axial bore that is dimensioned to be a concentricity providing sliding fit around the ferrule, and the ferrule having an axial bore dimensioned to be a concentricity providing sliding fit around the metallised bare fibre, wherein the bare fibre is secured in the bore of the ferrule and the ferrule is secured in the enlarged bore of the plug, and wherein solder forming an hermetic seal is applied formed into a fillet uniting the metallised bare optical fibre to the plug at the point of emergence of the fibre therefrom.

* * * * *